US011759978B2

United States Patent
Baranowski et al.

(10) Patent No.: US 11,759,978 B2
(45) Date of Patent: Sep. 19, 2023

(54) PRODUCTION OF A THERMOPLASTIC INJECTION-MOLDING-MATERIAL GRANULATE AND OF AN INJECTION-MOLDED COMPONENT, AND A GRANULATE GRAIN

(71) Applicant: FORD GLOBAL TECHNOLOGIES, LLC, Dearborn, MI (US)

(72) Inventors: Thomas Baranowski, Würselen (DE); Markus Franzen, Stolberg (DE); Maik Broda, Würselen (DE); Pascal Rebmann, Frankfurt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 16/953,718

(22) Filed: Nov. 20, 2020

(65) Prior Publication Data
US 2021/0154888 A1    May 27, 2021

(30) Foreign Application Priority Data

Nov. 21, 2019   (DE) .......................... 102019131513.1

(51) Int. Cl.
*B29B 9/14* (2006.01)
*B29C 45/00* (2006.01)
(Continued)

(52) U.S. Cl.
CPC .................. *B29B 9/14* (2013.01); *B29B 9/06* (2013.01); *B29B 9/16* (2013.01); *B29C 45/0001* (2013.01);
(Continued)

(58) Field of Classification Search
CPC .... B29B 9/14; B29B 9/06; B29B 9/16; B29B 2009/163; B29B 7/92; B29B 7/94;
(Continued)

(56) References Cited

U.S. PATENT DOCUMENTS

| 5,026,736 A | 6/1991 | Pontiff |
| 5,500,175 A * | 3/1996 | Bradt ........................ B29B 9/02 |
| | | 264/171.23 |

(Continued)

FOREIGN PATENT DOCUMENTS

| CN | 103374166 A | 10/2013 |
| CN | 108192200 A | 6/2018 |

(Continued)

OTHER PUBLICATIONS

German Exam Report for German Application No. DE 102019131513.1, dated Nov. 22, 2019, 4 pages.

(Continued)

*Primary Examiner* — Monica A Huson
(74) *Attorney, Agent, or Firm* — Vincent Mastrogiacomo; Brooks Kushman P.C.

(57) ABSTRACT

A system for production of a thermoplastic injection molding material granulate has at least one production unit for the production of a fiber reinforced plastic granulate from a thermoplastic granulate and natural fibers. to the system has at least one heat-treatment unit for the treatment of the fiber-reinforced plastic granulate providing heat such that an outer layer of each heated granulate grain of the fiber-reinforced plastic granulate is at least partially converted to a liquid physical state. The system has at least one applicator unit for applying a chemical foaming agent powder to at least some portions of each heated granulate grain, where the heat treatment unit is equipped to carry out the heat treatment such that a temperature of the molten outer layer of the respective granulate grain is below a reaction temperature of the foaming agent.

20 Claims, 1 Drawing Sheet

(51) Int. Cl.
   *B29B 9/16*      (2006.01)
   *B29C 45/76*     (2006.01)
   *B29B 9/06*      (2006.01)
   *C08J 3/12*      (2006.01)
   *C08J 5/04*      (2006.01)
   *B29K 23/00*     (2006.01)

(52) U.S. Cl.
   CPC ............ *B29C 45/762* (2013.01); *C08J 3/128*
      (2013.01); *B29B 2009/163* (2013.01); *B29K*
      *2023/12* (2013.01); *C08J 5/045* (2013.01);
      *C08J 2323/12* (2013.01)

(58) Field of Classification Search
   CPC ......... B29B 7/48; B29B 7/42; B29C 45/0001;
      B29C 45/762; C08J 3/128; C08J 2323/12;
      C08J 5/045; B29K 2311/10; B29K
      2023/12; B29L 2031/30
   See application file for complete search history.

(56) References Cited

U.S. PATENT DOCUMENTS 6,165,396  A  *  12/2000  Sato ................... B29C 45/0005
                                                      264/45.3
   8,647,543  B2     2/2014  Jaarsma 2003/0088025  A1 *  5/2003   Ogawa ....................... C08J 3/24
                                                           525/107
   2010/0151243  A1    6/2010   Glew
   2010/0222442  A1    9/2010   Prissok et al.
   2014/0159283  A1    6/2014   Lee et al.
   2018/0086871  A1    3/2018   Bokern et al.
   2018/0333905  A1   11/2018   Tong et al.

FOREIGN PATENT DOCUMENTS

EP        1702945 A1     9/2006
   GB        2512869 A     10/2014
   WO     2015086199 A1     6/2015

OTHER PUBLICATIONS

Szych, Pawel Dr. The New Process for Lightweight Foaming. Sep. 2017. https://www.kunststoffe.de/en/journal/archive/article/granulate-is-impregnated-with-co-in-an-autoclave-and-processed-on-standard-injection-molding-machines-4050298.html >.

* cited by examiner

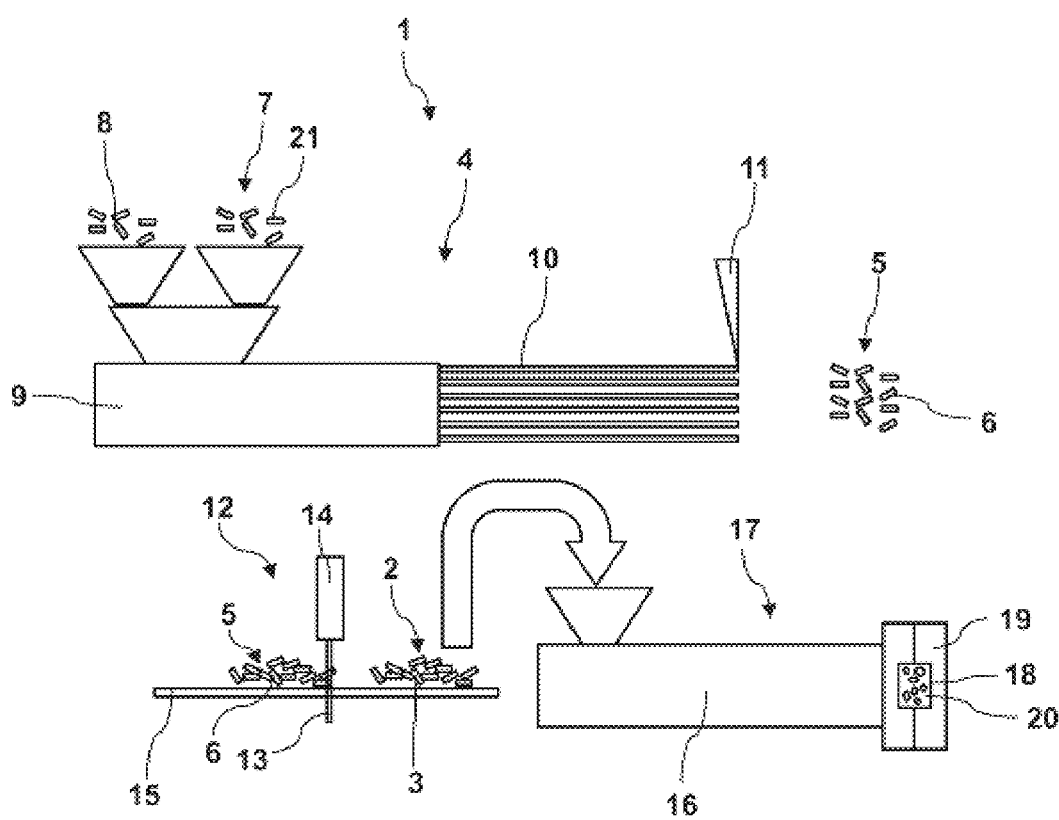

PRODUCTION OF A THERMOPLASTIC INJECTION-MOLDING-MATERIAL GRANULATE AND OF AN INJECTION-MOLDED COMPONENT, AND A GRANULATE GRAIN

CROSS-REFERENCE TO RELATED APPLICATIONS

This application claims foreign priority benefits under 35 U.S.C. § 119(a)-(d) to DE application 10 2019 131 513.1 filed Nov. 21, 2019, which is hereby incorporated by reference in its entirety.

TECHNICAL FIELD

The disclosure relates to a process for the production of a thermoplastic injection-molding-material granulate, where a fiber-reinforced plastic granulate is produced from a thermoplastic granulate and natural fibers. The disclosure further relates to a process for the production of an injection-molded component, in particular vehicle component, using a thermoplastic injection molding material granulate. Furthermore, the disclosure relates to a system for the production of a thermoplastic injection molding material granulate, the system having at least one production unit for the production of a fiber-reinforced plastics granulate from a thermoplastic granulate and natural fibers. The disclosure further relates to a granulate grain for a thermoplastic injection molding material granulate.

BACKGROUND

Plastic materials are nowadays frequently reinforced with materials such as glass, carbon, talc, and the like, with the aim of improving their properties with respect to their use. Natural fibers can also be used for the reinforcement of plastics; these can be obtained from various plants, examples being sisal, wood, wheat, hemp, bamboo, and the like.

When plastics reinforced with natural fibers are compared with unreinforced plastics, the plastics reinforced with natural fibers disadvantageously have higher viscosity. Plastics reinforced with natural fibers therefore require higher pressure and higher volume flow rates to fill a cavity of an injection mold during an injection-molding process. These increased process parameters lead to higher internal mechanical stresses and higher temperatures and may lead to degradation of the natural fibers. This in turn impairs mechanical properties of an injection-molding granulate thus produced and/or gives the granulate, and any injection-molded component produced therefrom, an unpleasant odor.

WO 2015/086 199 A1 discloses a process for the production of a fiber-reinforced plastics component with a film hinge, where a plastic with admixed fibers is melted in an injection mold. The plastic is foamed with a foaming agent, and the foamed plastics composition is injected into a component mold which has a section for the formation of a film hinge. The plastics component is solidified and removed from the component mold.

U.S. Pat. No. 8,647,543 B2 discloses a process for the production of a fiber-reinforced polymer-foam article, where fibers are incorporated into the foam article during an injection molding process.

US 2018/0 333 905 A1 discloses a component carrier with a first supportive structure which has a basically rectangular cross section, and with a second supportive structure, which has a basically rectangular cross section, where the first supportive structure and the second supportive structure are composed of fiber-filled polypropylene, and the component carrier is configured to be a part of an electric vehicle.

CN 103 374 166 A discloses a process for the production of a composite material which is produced from a thermoplastic, bamboo fibers, an adhesion promoter, a compatibilizer, a blowing agent, a reinforcing material, and a mixing aid.

CN 108 192 200 A discloses a process for the production of a hyperbranched polyamidoamine-modified, vegetable-fiber-reinforced, microfoamed polypropylene composite material from a polypropylene-composite material and a chemical foaming agent, where the polypropylene composite material consists of polypropylene, hyperbranched polyamidoamine vegetable fibers, PP-g-GMA, an antioxidant agent, a lubricant, and other additives.

US 2014/0 159 283 A1 discloses a process for the production of a natural-fiber-polymer-composite article. A polymer, a natural fiber, and a supercritical fluid are introduced into an extruder to form a natural fiber polymer mixture. The natural fiber polymer mixture is extruded to form a well-dispersed natural fiber polymer composite material. The natural fiber polymer composite is injected into a mold to form an article. The supercritical fluid may be introduced after the polymer has been introduced into the extruder or the injection molding machine. The supercritical fluid may be introduced before or after the introduction of the natural fiber into the extruder or the injection molding machine.

GB 2 512 869 A discloses a composite material with a matrix material and with a material based on organic natural fibers, where the matrix material comprises a thermoplastic polymer matrix.

The publication that can be retrieved by using the link https://www.kunststoffe.de/en/journal/archive/article/granulate-is-impregnated-with-co-in-an-autoclave-and-processed-on-standard-injection-molding-machines-4050298.html, entitled "The New Process for Lightweight Foaming" discloses a process for the production of an injection-molded component, where a granulate is introduced into an autoclave and processed by an injection molding machine.

SUMMARY

It is an object of this disclosure to disclose a production method of injection-molded components with higher quality than known prior art.

According to at least one embodiment, the object is achieved by a process according to which the fiber-reinforced plastics granulate is subjected to a heat treatment in a manner such that an external or outer layer of each heated granulate grain of the fiber-reinforced plastics granulate is at least to some extent converted to a liquid physical state, and a powder made of a chemical foaming agent is applied in at least some regions or portions to each heated granulate grain, where the heat treatment is carried out such that a temperature of the liquid external layer of the respective granulate grain is below a reaction temperature of the foaming agent.

It should be noted that the features and measures listed individually in the description below may be combined with one another in any desired technically useful manner and reveal further embodiments of the disclosure. The description additionally characterizes and specifies the disclosure in particular in conjunction with the FIGURE.

When the thermoplastic injection molding material granulate is plasticized in a plasticizing unit of an injection molding machine, the granulate grains comprising natural fiber are melted to form a liquid injection molding composition. At the same time, or while the granulate grains are being melted, the foaming agent is heated to, or above, its reaction temperature, and the foaming agent thus foams the liquid injection-molding composition. The injection molding composition thus foamed has a lower density and a lower viscosity than a conventional unfoamed injection molding composition made of a plastic and natural fibers. It is thus possible to fill a cavity of an injection mold during an injection molding process with the injection molding composition without any requirement for higher pressure and higher volume flow rates. The injection molding composition therefore exhibits no occurrence of increased internal mechanical stresses and higher temperatures that could lead to degradation of the natural fibers. Injection molding granulate thus produced, and/or any injection molded component produced from the granulate, thus has/have the desired mechanical properties, and no unpleasant odor. Therefore, the overall effect of the disclosure is to provide the production of injection-molded components with higher quality.

The process is used for the production of a fiber-reinforced, thermoplastic injection molding material granulate, the injection molding material being produced in the form of a flowable mass by plasticizing the injection molding material granulate. The fiber-reinforced plastics granulate may have a plastics matrix composed of, partially or entirely, for example, polypropylene or polyethylene and natural fibers embedded into the plastics matrix.

The natural fibers may be, for example, seed fibers, bast fibers, or hard fibers. The proportion of the natural fibers may be, for example, up to 40%. The use of natural fibers is advantageous because the natural fibers are a renewable raw material that may be used in a sustainable manner, and because natural fibers have high stiffness, the natural fibers provide correspondingly better mechanical properties to the injection-molded components. The mechanical properties of the natural fibers are subject to less impairment in the process discloses herein than in conventional production processes.

The fiber-reinforced plastics granulate used may be produced in a conventional manner. For example, at least one strand may first be produced from the thermoplastic granulate and natural fibers, the granulate grains then being separated from the strand; this permits automation of the production of the fiber-reinforced plastics granulate.

During the heat treatment of the fiber-reinforced plastics granulate, the respective granulate grain is heated, at least in the external or outer layer, to a temperature in the range of the melting point of the thermoplastic content of the granulate grain. The heating is conducted in such manner that the external layer of the granulate grain is completely, or to some extent, converted to a liquid physical state. However, the external layer of the respective granulate grain is heated only to a temperature below the reaction temperature of the foaming agent. The reaction temperature of the foaming agent is therefore higher than the melting point of the thermoplastic content. The external layer of the respective granulate grain may therefore be heated, during the heat treatment, to a temperature that lies between the melting point of the thermoplastic content and the reaction temperature of the foaming agent.

The chemical foaming agent powder is applied, at least in some regions, to each heated granulate grain during the heat treatment while the external layer of the respective granulate grain has a tacky surface in the region in which it has been melted, and the powder may therefore adhere very successfully on the molten surface. After the powder has been applied to the granulate grains, the granulate grains thus formed of the thermoplastic injection molding material granulate may be actively or passively cooled and stored for a subsequent use. Alternatively, these granulate grains may be introduced directly into a plasticizing unit of an injection molding machine. The chemical foaming agent application to at least some regions of each granulate grain heated during the heat treatment may be carried out very cost-effectively.

According to one or more embodiments, infrared radiation is used to carry out the heat treatment. It is thus possible to achieve very precise control of the heat treatment and/or of the heat introduced into the granulate grains. The fiber-reinforced plastics granulate may be moved around during the heat treatment to achieve maximal uniformity of appropriate heating of the granulate grains from all sides.

In one or more embodiments, the heated granulate grains may be sprinkled or sprayed with the powder or may be dipped into the powder. For this purpose, it is possible, for example, to use a gravity cascade system, a circulation system, a bath and filter system, or the like, to bring the powder into contact with the granulate grains that were heated during the heat treatment.

The above object is further achieved by a process according to which the thermoplastic injection molding material granulate may be produced according to any of the above-mentioned embodiments or according to a combination of at least two of the disclosed embodiments with one another.

The disclosed process results in the advantages mentioned above. The disclosed process enables production of injection-molded components, for example, interior cladding, lining, or skin components for vehicles.

According to one or more embodiments, the thermoplastic injection molding material granulate may be heated in a plasticizing unit of the injection-molding machine before being introduced into an injection mold of the machine. The material granulate may be heated to a temperature which is equal to or above the reaction temperature of the foaming agent. The foaming agent is thus activated to foam the thermoplastic.

The above object may be also achieved via a system having at least one heat treatment unit for the treatment of the fiber-reinforced plastics granulate. The system may provide heat such that an external layer of each heated granulate grain of the fiber-reinforced plastics granulate is at least partially converted to a liquid physical state. The system may have at least one applicator unit for applying a powder chemical foaming agent to at least some regions or areas of each heated granulate grain. The heat-treatment unit is equipped to carry out the heat treatment such that a temperature of the liquid external or outer layer of the respective granulate grain is below a reaction temperature of the foaming agent.

The system has the advantages described above. In particular, the system may be used for carrying out the process according to one or more embodiments or a combination of at least two of the embodiments with one another. The heat-treatment unit may include, for example, an oven or the like. The heat-treatment unit may include, for example, at least one radiation unit for the generation of infrared radiation. The applicator unit may include, for example, a gravity-cascade system, a circulation system, a bath-and-filter system, or the like.

According to one or more embodiments, the production unit may have at least one device for the production of at least one strand from the thermoplastic granulate and the natural fibers, and may have, downstream of the device, a separator unit which may separate granulate grains from the strand.

The above object may be further achieved by a granulate grain having a core made of a thermoplastic and natural fibers and a layer made of chemical foaming agent(s) at least partially enclosing, covering, or surrounding the core.

The granulate grain has the advantages mentioned above with reference to the process described above. In particular, the granulate grain may be produced by the process according to any of the abovementioned embodiments, or of a combination of at least two of the embodiments with one another.

Other advantageous embodiments of the disclosure are disclosed herein and in the following description of the FIGURE.

BRIEF DESCRIPTION OF THE DRAWINGS

The FIGURE is a diagram of one or more embodiments described herein for a system for the production of a thermoplastic injection molding material granulate.

DETAILED DESCRIPTION

As required, detailed embodiments of the present invention are disclosed herein; however, it is to be understood that the disclosed embodiments are merely exemplary of the invention that may be embodied in various and alternative forms. The FIGURE is not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The FIGURE is a diagram of at least one embodiment disclosed herein for a system 1 for the production of thermoplastic injection molding material granulate 2 with granulate grains 3.

The system 1 has a production unit 4 for the production of a fiber-reinforced plastics granulate 5 with granulate grains 6. The granulate 5 is produced from a thermoplastic granulate 7 with granulate grains 21 and natural fibers 8. For this purpose, the production unit 4 has a device 9 for the production of a plurality of strands 10 from the thermoplastic granulate 7 and the natural fibers 8. The production unit 4 further has, downstream of the device 9, a separator unit 11 which may separate granulate grains 6 of the fiber-reinforced plastics granulate 5 from the strands 10.

The system 1 additionally has a heat-treatment unit, not shown, for the treatment of the fiber-reinforced plastics granulate 5 with heat such that an external or outer layer, not shown, of each heated granulate grain 6 of the fiber-reinforced plastics granulate 5 is at least to some extent converted to a liquid physical state. The heat-treatment unit may have at least one source (not shown) of infrared light.

The system 1 also has an applicator unit 12 for applying a powder 13, made of a chemical foaming agent, to at least some regions or portions of each heated granulate grain 6 of the fiber-reinforced plastics granulate 5. The applicator unit 12 has a powder-dispensing unit 14 and, running underneath the powder-dispensing unit 14, a transport or conveyor belt 15 which moves the granulate grains 6 through the dispensed powder 13.

The heat-treatment unit is equipped to carry out the heat treatment such that a temperature of the liquid external or outer layer of the respective granulate grain 6 of the fiber-reinforced plastics granulate 5 is below a reaction temperature of the foaming agent.

The thermoplastic injection molding material granulate 2 is then introduced into a plasticizing unit 16 of an injection molding machine 17. In the plasticizing unit 16, the foaming agent is activated, thus producing a foamed, liquid injection molding composition, not shown. The composition is injected into a cavity 18 of an injection mold 19 of the injection molding machine 17 to produce an injection-molded component 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a natural fiber-reinforced thermoplastic injection molding material granulate, the method comprising:
   combining a thermoplastic granulate and natural fibers to produce at least one strand and separating granulate grains from the strand,
   first heating of the granulate grains such that an outer layer of the granulate grains is at least partially converted to a liquid physical state and a temperature of the molten outer layer is below a reaction temperature of a foaming agent during the first heating, the first heating including infrared radiation; and
   applying a powder comprising the foaming agent to at least some portions of the granulate grains to form the natural fiber-reinforced thermoplastic injection molding material granulate.

2. The method of claim 1, wherein the temperature is a temperature in a range of a melting point of a thermoplastic content of the granulate grains.

3. The method of claim 1, wherein the first heating includes moving the granulate grains around to uniformly heat the granulate grains on all sides.

4. The method of claim 1, wherein the applying includes sprinkling or spraying the powder onto the granulate grains.

5. The method of claim 1, wherein the applying includes dipping the heated granulate grains in the powder.

6. The method of claim 1, wherein the fiber reinforced granulate grains comprise a plastic matrix including polypropylene and natural fibers embedded into the plastic matrix.

7. The method of claim 1, wherein the powder-containing granulate grains comprise:
   a core having a thermoplastic and natural fibers; and
   the outer layer including the foaming agent, the outer layer at least partially covering the core.

8. The method of claim 1, wherein the natural fibers comprise bast fibers.

9. The method of claim 1, further comprising a second heating step of the natural fiber-reinforced thermoplastic injection molding material granulate in a plasticizing unit of an injection molding machine to a temperature which is equal to or above the reaction temperature of the foaming agent.

10. The method of claim 9, wherein the second heating step includes melting of the granulate grains in the plasticizing unit to form a liquid injection molding composition and foaming the liquid injection molding composition with the foaming agent.

11. The method of claim 1, further comprising introducing the heated fiber-reinforced thermoplastic injection molding material granulate to an injection mold of an injection molding machine.

12. The method of claim 11, further comprising forming a vehicle component by molding the natural fiber-reinforced thermoplastic injection molding material granulate into the vehicle component in the injection mold.

13. A method of making a natural fiber-reinforced thermoplastic injection molding material granulate, the method comprising:
   combining a thermoplastic granulate and natural fibers to produce at least one strand and separating granulate grains from the strand,
   first heating of the granulate grains such that an outer layer of the granulate grains is at least partially converted to a liquid physical state and a temperature of the molten outer layer is below a reaction temperature of a foaming agent during the first heating, the first heating including moving the granulate grains around to uniformly heat the granulate grains on all sides; and
   applying a powder comprising the foaming agent to at least some portions of the granulate grains to form the natural fiber-reinforced thermoplastic injection molding material granulate.

14. The method of claim 13, wherein the temperature is a temperature in a range of a melting point of a thermoplastic content of the granulate grains.

15. The method of claim 13, wherein the applying includes sprinkling or spraying the powder onto the granulate grains.

16. The method of claim 13 further comprising a second heating step of the natural fiber-reinforced thermoplastic injection molding material granulate in a plasticizing unit of an injection molding machine to a temperature which is equal to or above the reaction temperature of the foaming agent.

17. A method of making a natural fiber-reinforced thermoplastic injection molding material granulate, the method comprising:
   combining a thermoplastic granulate and natural fibers to produce at least one strand and separating granulate grains from the strand,
   first heating of the granulate grains such that an outer layer of the granulate grains is at least partially converted to a liquid physical state and a temperature of the molten outer layer is below a reaction temperature of a foaming agent during the first heating; and
   applying a powder comprising the foaming agent to at least some portions of the granulate grains to form the natural fiber-reinforced thermoplastic injection molding material granulate, the applying including dipping the heated granulate grains in the powder.

18. The method of claim 17, wherein the temperature is a temperature in a range of a melting point of a thermoplastic content of the granulate grains.

19. The method of claim 17 further comprising a second heating step of the natural fiber-reinforced thermoplastic injection molding material granulate in a plasticizing unit of an injection molding machine to a temperature which is equal to or above the reaction temperature of the foaming agent.

20. The method of claim 17 further comprising introducing the heated fiber-reinforced thermoplastic injection molding material granulate to an injection mold of an injection molding machine.

* * * * *